United States Patent

Yasuda et al.

(10) Patent No.: US 9,831,956 B2
(45) Date of Patent: Nov. 28, 2017

(54) SIGNAL PROCESSING DEVICE AND SIGNAL PROCESSING METHOD

(71) Applicant: NEC Corporation, Minato-ku, Tokyo (JP)

(72) Inventors: Wakako Yasuda, Tokyo (JP); Junichi Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 294 days.

(21) Appl. No.: 14/765,908

(22) PCT Filed: Sep. 19, 2013

(86) PCT No.: PCT/JP2013/075230
§ 371 (c)(1),
(2) Date: Aug. 5, 2015

(87) PCT Pub. No.: WO2014/122815
PCT Pub. Date: Aug. 14, 2014

(65) Prior Publication Data
US 2015/0372765 A1    Dec. 24, 2015

(30) Foreign Application Priority Data
Feb. 7, 2013    (JP) .................................. 2013-022681

(51) Int. Cl.
*H04B 10/2507*    (2013.01)
*H04B 10/61*    (2013.01)
(Continued)

(52) U.S. Cl.
CPC ..... *H04B 10/6165* (2013.01); *H04B 10/0795* (2013.01); *H04B 10/2543* (2013.01);
(Continued)

(58) Field of Classification Search
CPC ............ H04B 10/6161; H04B 10/2507; H04B 10/25133; H04B 10/2543; H04B 10/6162;
(Continued)

(56) References Cited

U.S. PATENT DOCUMENTS

2006/0013597 A1* 1/2006 Crivelli .............. H04B 10/6971
398/208
2010/0046961 A1* 2/2010 Tanimura .................. H03F 3/08
398/159
(Continued)

FOREIGN PATENT DOCUMENTS

JP    2011-228819 A    11/2011
JP    2012-248944 A    12/2012
(Continued)

OTHER PUBLICATIONS

International Search Report for PCT Application No. PCT/JP2013/075230, dated Nov. 19, 2013.
(Continued)

*Primary Examiner* — David Payne
*Assistant Examiner* — Tanya Motsinger (57) ABSTRACT

A nonlinear compensation unit (300) includes a first compensation unit (350) and a second compensation unit (360). The first compensation unit (350) compensates for each of two polarization signals $E_x$ and $E_y$ so as to cancel a first amount of phase rotation which is the amount of phase rotation calculated based on the signal strength of the two polarization signals $E_x$ and $E_y$. The second compensation unit (360) compensates for each of the two polarization signals $E_x$ and $E_y$ so as to cancel a second amount of phase rotation which is the amount of phase rotation calculated based on the perturbative component of the two polarization signals $E_x$ and $E_y$. The first compensation unit (350) includes a strength calculation unit (302), a first filter unit (304), and a first phase modulation unit (306). The second compensa-
(Continued)

tion unit (360) includes a perturbative component calculation unit (316), a second filter unit (318), a second phase modulation unit (322), and a third phase modulation unit (330).

10 Claims, 6 Drawing Sheets

(51) Int. Cl.
  *H04J 14/06* (2006.01)
  *H04B 10/079* (2013.01)
  *H04B 10/2543* (2013.01)

(52) U.S. Cl.
  CPC ........ *H04B 10/2572* (2013.01); *H04B 10/613* (2013.01); *H04B 10/614* (2013.01); *H04B 10/6163* (2013.01); *H04J 14/06* (2013.01)

(58) Field of Classification Search
  CPC .............. H04B 10/6163; H04B 10/697; H04B 10/6971; H04B 1/12; H04B 10/252; H04J 14/06
  USPC .......................................... 398/159, 205, 208
  See application file for complete search history.

(56) References Cited

U.S. PATENT DOCUMENTS

| | | | | |
|---|---|---|---|---|
| 2010/0098420 A1* | 4/2010 | Ibragimov | .............. | H04J 14/06 398/65 |
| 2011/0255879 A1* | 10/2011 | Xie | .................... | H04B 10/2513 398/208 |
| 2012/0213532 A1* | 8/2012 | Hironishi | ........... | H04B 10/6165 398/208 |
| 2012/0294616 A1* | 11/2012 | Sasaki | ................. | H04J 14/0298 398/79 |
| 2012/0301146 A1* | 11/2012 | Mateo | ................ | H04B 10/6163 398/65 |
| 2013/0243433 A1* | 9/2013 | Yan | ..................... | H04B 10/2507 398/65 |
| 2013/0243434 A1* | 9/2013 | Endo | ........................ | H04J 14/06 398/65 |
| 2013/0302041 A1* | 11/2013 | Matsui | ............... | H04B 10/6161 398/208 |
| 2014/0286642 A1* | 9/2014 | Lowery | ................ | H04B 10/697 398/115 |
| 2015/0229409 A1* | 8/2015 | Chen | .................. | H04B 10/6161 398/208 |
| 2016/0036554 A1* | 2/2016 | Yasuda | .............. | H04B 10/6161 398/65 |

FOREIGN PATENT DOCUMENTS

| | | |
|---|---|---|
| WO | 2012/111140 A1 | 8/2012 |
| WO | 2012/111847 A1 | 8/2012 |

OTHER PUBLICATIONS

Liang B. Du and Arthur J. Lowery, "Improved single channel backpropagation for intra-channel fiber nonlinearity compensation in long-haul optical communication systems", Optics Express, Aug. 2, 2010, pp. 17075-17088, vol. 18, No. 16, Australia.

Weizhen Yan et al., "Low Complexity Digital Perturbation Back-Propagation", Proc. Conf. ECOC Tu.3.A.2, Jul. 27, 2011, Kawasaki Japan.

* cited by examiner

SIGNAL PROCESSING DEVICE AND SIGNAL PROCESSING METHOD

This application is a National Stage Entry of PCT/JP2013/075230 filed on Sep. 19, 2013, which claims priority from Japanese Patent Application 2013-022681 filed on Feb. 7, 2013, the contents of all of which are incorporated herein by reference, in their entirety.

TECHNICAL FIELD

The present invention relates to a signal processing device and a signal processing method which are used for optical communication.

BACKGROUND ART

With the spread of the Internet, the amount of data to be communicated has increased. In order to cope with this, it is necessary to increase the capacity of a transmission path. As one of the techniques for realizing large capacity, a multi-level modulation system (Quadrature Amplitude Modulation: QAM) is known. An optical signal modulated by the QAM system with a transmitter is demodulated with a digital coherent optical receiver.

In QAM optical communication, a nonlinear effect applied to the optical signal when propagating through the transmission path becomes a major problem. When the optical signal is applied with the nonlinear effect in the transmission path, the phase of the optical signal rotates. Since the QAM system handles complicated phase information, if the optical signal is applied with phase rotation due to the nonlinear effect, correct phase information cannot be demodulated at the time of reception.

Non-Patent Document 1 describes a nonlinear compensation system which is called Back Propagation. This compensation system is a system in which dispersion compensation is performed little by little and nonlinear compensation is performed immediately after respective dispersion compensation to compensate for waveform distortion while going back to a propagation waveform from the reception side to the transmission side.

However, in Back Propagation, when the dispersion compensation function and the nonlinear compensation function are combined as one nonlinear compensation stage, it is necessary to increase the number of nonlinear compensation stages. The dispersion compensation function is realized by a linear distortion compensation circuit, and the nonlinear compensation function is realized by a nonlinear distortion compensation circuit. The linear distortion compensation circuit includes an FFT/IFFT circuit in order to perform dispersion compensation in a frequency domain. Since the FFT/IFFT circuit is large in circuit scale, considering the mounting area of LSI or power consumption, only a few FFT/IFFT circuits can be mounted on one signal processing device.

Non-Patent Document 1 describes a compensation system which is called Filtered Back Propagation. In Filtered Back Propagation, the time average of the amount of phase rotation calculated from the signal strength is used for nonlinear compensation, thereby reducing the number of nonlinear compensation stages.

As a system which further reduces the number of nonlinear compensation stages, Perturbation Back Propagation is known. In Perturbation Back Propagation, in addition to cancelling phase rotation due to the signal strength, phase rotation due to the perturbative component is cancelled, whereby it is possible to reduce the nonlinear compensation stages, for example, to three stages (Non-Patent Document 2).

RELATED DOCUMENT

Non-Patent Document

[Non-Patent Document 1] Liang B. Du and Arthur J. Lowery, "Improved single channel backpropagation for intra-channel fiber nonlinearity compensation in long-haul optical communication systems", OPTICS EXPRESS, Vol. 18, No. 16, pp 17075, 2010

[Non-Patent Document 2] Weizhen Yan et al., "Low Complexity Digital Perturbation Back-Propagation", Proc. Conf. ECOC Tu.3.A.2, 2011

SUMMARY OF THE INVENTION

In Perturbation Back Propagation, separately from filtering of the amount of phase rotation due to the signal strength, it is also necessary to filter the amount of phase rotation due to the perturbative component. For this reason, filter circuits are required three times more than Filtered Back Propagation. In addition, phase modulation circuits for cancelling phase rotation are required two times more than Filtered Back Propagation. Since most of the nonlinear distortion compensation circuit is occupied with the filter circuits and the phase modulation circuits, the scale of the nonlinear compensation circuit per stage in Perturbation Back Propagation is two or more times greater than the scale of the nonlinear compensation circuit per stage in Filtered Back Propagation. For this reason, since the number of stages which are reducible is small, the circuit scale of the entire distortion compensation circuit in Perturbation Back Propagation is likely to be increased more than that in Filtered Back Propagation.

An object of the invention is to provide a signal processing device and a signal processing method capable of reducing the scale of a compensation circuit necessary for nonlinear distortion.

According to the invention, there is provided a signal processing device which processes two polarization signals, the two polarization signals being generated from four digital signals generated through photoelectric conversion and analog-to-digital conversion on four output light components generated by making polarization multiplexed and multi-level modulated signal light interfere with local light using an optical 90° hybrid as signals corresponding to two polarization components of the signal light, the signal processing device including:

a first compensation unit which compensates for each of the two polarization signals so as to cancel a first amount of phase rotation which is the amount of phase rotation calculated based on the signal strength of the two polarization signals; and a second compensation unit which compensates for each of the two polarization signals so as to cancel a second amount of phase rotation which is the amount of phase rotation calculated based on the perturbative component of the two polarization signals, wherein the first compensation unit includes a strength calculation unit which calculates the first amount of phase rotation based on the two polarization signals, a first filter unit which multiplies the first amount of phase rotation by a coefficient for averaging the first amount of phase rotation with time, and a first phase modulation unit which calculates a first coefficient for cancelling the first amount of phase rotation in the two polarization signals by using the first amount of phase rotation after being processed by the first filter unit, and the second compensation unit includes a perturbative component calculation unit which calculates the second amount of phase rotation based on the two polarization signals, a second filter unit which multiplies the second amount of phase rotation by a coefficient for averaging the second amount of phase rotation with time, a second phase modulation unit which calculates a second coefficient for cancelling the second amount of phase rotation of a first polarization signal by using the second amount of phase rotation after being processed by the second filter unit, and a third phase modulation unit which calculates a third coefficient for cancelling the second amount of phase rotation of a second polarization signal by using the complex conjugate of the second amount of phase rotation after being processed by the second filter unit.

According to the invention, there is provided a signal processing device which is used to process two polarization signals for generating a polarization multiplexed optical signal, the signal processing device including:

a first compensation unit which compensates for each of the two polarization signals so as to cancel a first amount of phase rotation which is the amount of phase rotation calculated based on the signal strength of the two polarization signals; and a second compensation unit which compensates for each of the two polarization signals so as to cancel a second amount of phase rotation which is the amount of phase rotation calculated based on the perturbative component of the two polarization signals, wherein the first compensation unit includes a strength calculation unit which calculates the first amount of phase rotation based on the two polarization signals, a first filter unit which multiplies the first amount of phase rotation by a coefficient for averaging the first amount of phase rotation with time, and a first phase modulation unit which calculates a first coefficient for cancelling the first amount of phase rotation in the two polarization signals by using the first amount of phase rotation after being processed by the first filter unit, and the second compensation unit includes a perturbative component calculation unit which calculates the second amount of phase rotation based on the two polarization signals, a second filter unit which multiplies the second amount of phase rotation by a coefficient for averaging the second amount of phase rotation with time, a second phase modulation unit which calculates a second coefficient for cancelling the second amount of phase rotation of a first polarization signal by using the second amount of phase rotation after being processed by the second filter unit, and a third phase modulation unit which calculates a third coefficient for cancelling the second amount of phase rotation of a second polarization signal by using the complex conjugate of the second amount of phase rotation after being processed by the second filter unit.

According to the invention, there is provided a signal processing method which processes two polarization signals, the two polarization signals being generated from four digital signals generated through photoelectric conversion and analog-to-digital conversion on four output light components generated by making polarization multiplexed and multi-level modulated signal light interfere with local light using an optical 90° hybrid as signals corresponding to two polarization components of the signal light, the signal processing method performing:

first compensation processing for compensating for each of the two polarization signals so as to cancel a first amount of phase rotation which is the amount of phase rotation calculated based on the signal strength of the two polarization signals; and second compensation processing for compensating for each of the two polarization signals so as to cancel a second amount of phase rotation which is the amount of phase rotation calculated based on the perturbative component of the two polarization signals, wherein the first compensation processing includes strength calculation processing for calculating the first amount of phase rotation based on the two polarization signals, first filter processing for multiplying the first amount of phase rotation by a coefficient for averaging the first amount of phase rotation with time, and first phase modulation processing for calculating a first coefficient for cancelling the first amount of phase rotation in the two polarization signals by using the first amount of phase rotation after the first filter processing is performed, and the second compensation processing includes perturbative component calculation processing for calculating the second amount of phase rotation based on the two polarization signals, second filter processing for multiplying the second amount of phase rotation by a coefficient for averaging the second amount of phase rotation with time, second phase modulation processing for calculating a second coefficient for cancelling the second amount of phase rotation of a first polarization signal by using the second amount of phase rotation after the second filter processing is performed, and third phase modulation processing for calculating a third coefficient for cancelling the second amount of phase rotation of a second polarization signal by using the complex conjugate of the second amount of phase rotation after the second filter processing is performed.

According to the invention, there is provided a signal processing method which processes two polarization signals for generating a polarization multiplexed optical signal, the signal processing method performing:

first compensation processing for compensating for each of the two polarization signals so as to cancel a first amount of phase rotation which is the amount of phase rotation calculated based on the signal strength of the two polarization signals; and second compensation processing for compensating for each of the two polarization signals so as to cancel a second amount of phase rotation which is the amount of phase rotation calculated based on the perturbative component of the two polarization signals, wherein the first compensation processing includes strength calculation processing for calculating the first amount of phase rotation based on the two polarization signals, first filter processing for multiplying the first amount of phase rotation by a coefficient for averaging the first amount of phase rotation with time, and first phase modulation processing for calculating a first coefficient for cancelling the first amount of phase rotation in the two polarization signals by using the first amount of phase rotation after the first filter processing is performed, and the second compensation processing includes perturbative component calculation processing for calculating the second amount of phase rotation based on the two polarization signals, second filter processing for multiplying the second amount of phase rotation by a coefficient for averaging the second amount of phase rotation with time, second phase modulation processing for calculating a second coefficient for cancelling the second amount of phase rotation of a first polarization signal by using the second amount of phase rotation after the second filter processing is performed, and third phase modulation processing for calculating a third coefficient for cancelling the second amount of phase rotation of a second polarization signal by using the complex conjugate of the second amount of phase rotation after the second filter processing is performed.

According to the invention, it is possible to reduce the scale of a compensation circuit necessary for nonlinear distortion in signal processing of optical communication.

BRIEF DESCRIPTION OF THE DRAWINGS

These and other objects, features, and advantages of the invention will be apparent through reference to the description of preferred exemplary embodiments and accompanying drawings.

DESCRIPTION OF EXEMPLARY EMBODIMENTS

Hereinafter, exemplary embodiments of the invention will be described referring to the drawings. In the drawings, the same components are represented by the same reference numerals, and description thereof will not be repeated.

(First Exemplary Embodiment)

Figure 1:
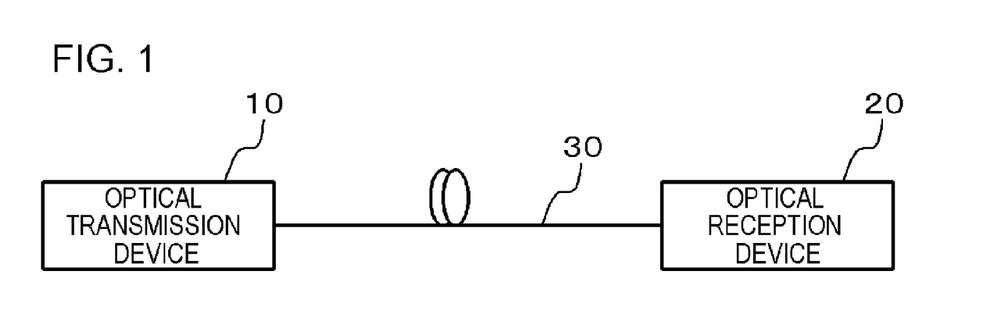
FIG. 1 is a diagram showing the configuration of an optical communication system according to a first exemplary embodiment.

FIG. 1 is a diagram showing the configuration of an optical communication system according to a first exemplary embodiment. The optical communication system of this exemplary embodiment includes an optical transmission device 10 and an optical reception device 20. The optical transmission device 10 and the optical reception device 20 are connected to each other through a transmission path 30. The transmission path 30 is constituted using an optical fiber or the like. The optical communication system is a system which performs communication, for example, through a quadrature amplitude modulation (QAM) system.

The optical transmission device 10 modulates carrier waves using a plurality of signals to be transmitted, thereby generating a polarization multiplexed optical signal. The generated optical signal is transmitted to the optical reception device 20 through the transmission path 30. The optical reception device 20 demodulates the received optical signal. The optical signal is applied with a linear effect (dispersion effect) and a nonlinear effect when propagating through the transmission path 30. The optical reception device 20 also performs processing for compensating for the effects.

Figure 2:
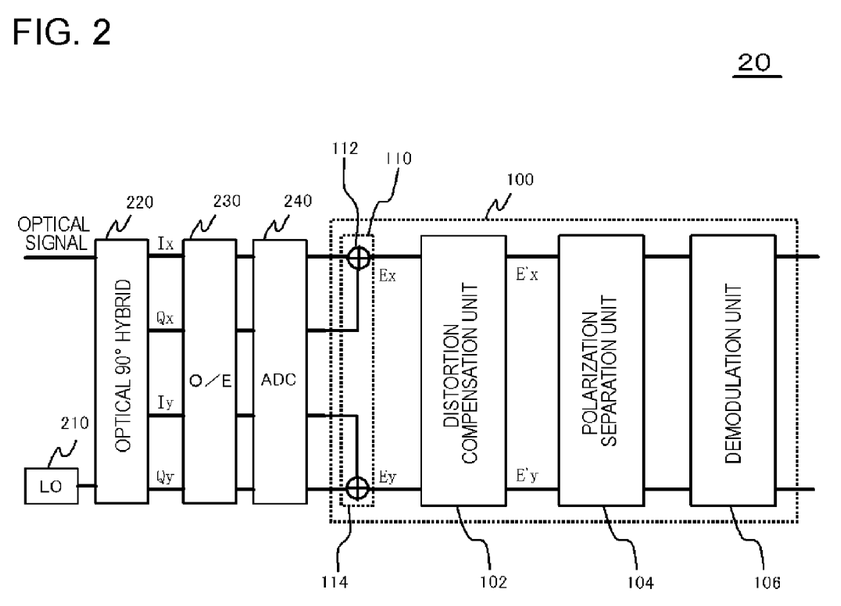
FIG. 2 is a block diagram showing the functional configuration of an optical reception device.

FIG. 2 is a block diagram showing the functional configuration of the optical reception device 20. The optical reception device 20 includes a local light source (LO) 210, an optical 90° hybrid 220, a photoelectric (O/E) conversion unit 230, an AD (analog-to-digital) conversion unit (ADC) 240, and a signal processing unit 100.

The optical 90° hybrid 220 receives signal light from the transmission path and local light from the local light source 210 as input. The optical 90° hybrid 220 makes the optical signal interfere with local light with a phase difference of 0 to generate a first optical signal ($I_x$), and makes the optical signal interfere with local light with a phase difference of $\pi/2$ to generate a second optical signal ($Q_x$). In addition, the optical 90° hybrid 220 makes the optical signal interfere with local light with the phase difference of 0 to generate a third optical signal ($I_y$), and makes the optical signal interfere with local light with the phase difference of $\pi/2$ to generate a fourth optical signal ($Q_y$). The first optical signal and the second optical signal form a set of signals, and the third optical signal and the fourth optical signal form a set of signals.

The photoelectric conversion unit 230 photoelectrically converts the four optical signals (output light) generated by the optical 90° hybrid 220 to generate four analog signals.

The AD conversion unit 240 converts each of the four analog signals generated by the photoelectric conversion unit 230 to a digital signal (quantization).

The signal processing device 100 processes the four digital signals generated by the AD conversion unit 240 to generate a demodulated signal of the optical signal. Specifically, the signal processing unit 100 includes a polarization signal generation unit 110, a distortion compensation unit 102, a polarization separation unit 104, and a demodulation unit 106.

The polarization signal generation unit 110 includes addition units 112 and 114. The addition unit 112 adds the digital signal generated from the first optical signal ($I_x$) and the digital signal generated from the second optical signal ($Q_x$) to generate a first polarization signal ($E_x$). The addition unit 114 adds the digital signal generated from the third optical signal ($I_y$) and the digital signal generated from the fourth optical signal ($Q_y$) to generate a second polarization signal ($E_y$). Specifically, $E_x$ and $E_y$ follow Expressions (1) and (2) described below.

[Math 1]

$$E_x = I_x + jQ_x \tag{1}$$

[Math 2]

$$E_y = I_y + jQ_y \tag{2}$$

The distortion compensation unit 102 performs processing for compensating for the linear effect and the nonlinear effect applied when the optical signal propagates through the transmission path 3. Details of the distortion compensation unit 102 will be described below.

The polarization separation unit 104 performs filter calculation for each polarization. The demodulation unit 106 compensates for the frequency difference and the phase difference between the optical signal and local light to demodulate the transmitted signals.

Figure 3:
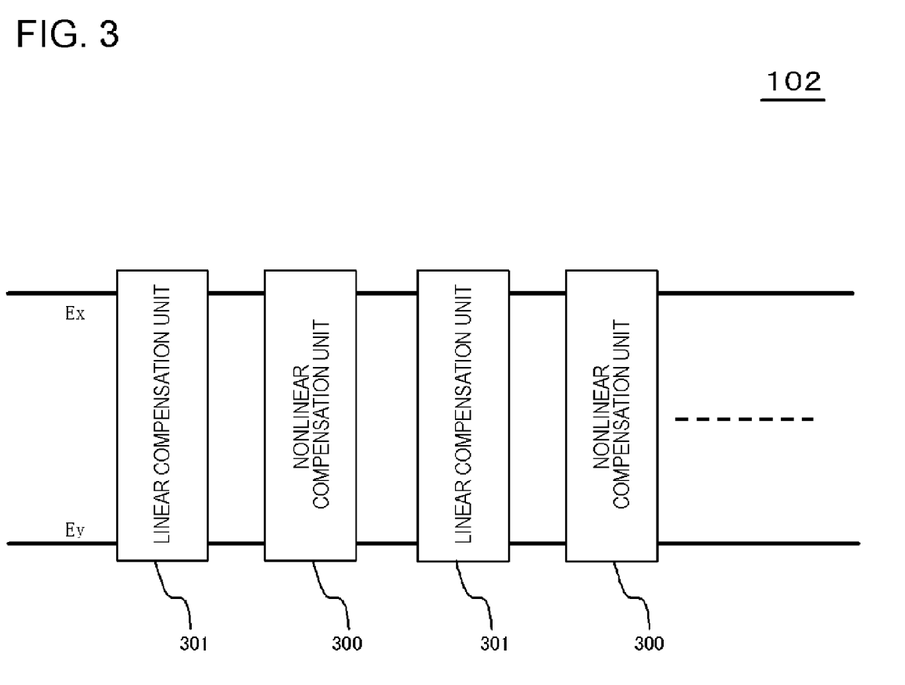
FIG. 3 is a diagram illustrating the functional configuration of a distortion compensation unit.

FIG. 3 is a diagram illustrating the functional configuration of the distortion compensation unit 102. The distortion compensation unit 102 has a plurality of processing stages including a linear compensation unit 301 and a nonlinear compensation unit 300. When the number of processing stages is small (for example, equal to or less than five stages), the final stage of the distortion compensation unit 102 is preferably the linear compensation unit 301. However, when the number of processing stages is, for example, equal to or greater than ten stages, the final stage of the distortion compensation unit 102 may not be the linear compensation unit 301.

The linear compensation unit 301 compensates for the linear effect applied to the optical signal in the transmission path 30. The linear compensation unit 301 includes, for example, a Fast Fourier Transform (FFT) unit, a filter unit, and an Inverse Fast Fourier Transform (IFFT) unit. The FFT unit performs FFT calculation of an input signal. The filter unit performs filter calculation of a signal using a filter coefficient for compensating for the dispersion effect applied to the optical signal in the transmission path. The IFFT unit performs IFFT calculation of the filtered signal.

The nonlinear compensation unit 300 compensates for the nonlinear effect applied to the optical signal in the transmission path 30.

Figure 4:
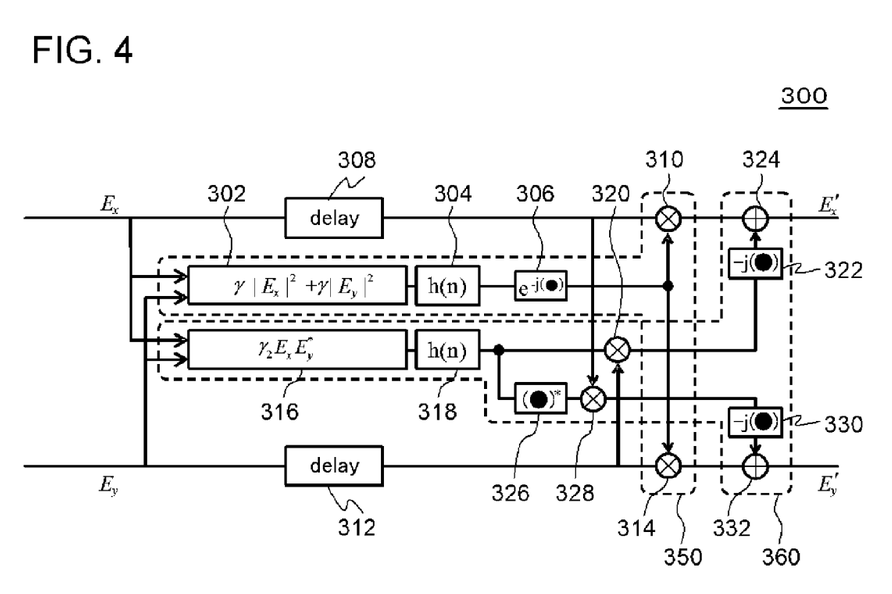
FIG. 4 is a block diagram showing the functional configuration of a nonlinear compensation unit.

FIG. 4 is a block diagram showing the functional configuration of the nonlinear compensation unit 300. The nonlinear compensation unit 300 includes a first compensation unit 350 and a second compensation unit 360. The first compensation unit 350 compensates for each of the two polarization signals $E_x$ and $E_y$ so as to cancel a first amount of phase rotation which is the amount of phase rotation calculated based on the signal strength of the two polarization signals $E_x$ and $E_y$. The second compensation unit 360 compensates for each of the two polarization signals $E_x$ and $E_y$ so as to cancel a second amount of phase rotation which is the amount of phase rotation calculated based on the perturbative component of the two polarization signals $E_x$ and $E_y$.

Specifically, the first compensation unit 350 includes a strength calculation unit 302, a first filter unit 304, and a first phase modulation unit 306. The strength calculation unit 302 calculates the first amount of phase rotation based on the two polarization signals $E_x$ and $E_y$. The first filter unit 304 multiplies the first amount of phase rotation by a coefficient ($h(n)$) for averaging the first amount of phase rotation with time. The first phase modulation unit 306 calculates a first coefficient by using the first amount of phase rotation after being processed by the first filter unit 304. The first coefficient is a coefficient for cancelling the first amount of phase rotation in the two polarization signals $E_x$ and $E_y$. The first coefficient is multiplied by the polarization signal $E_x$ after being delayed by a delay unit 308 by a multiplication unit 310, and is multiplied by the polarization signal $E_y$ after being delayed by a delay unit 312 by a multiplication unit 314. The delay units 308 and 312 are provided to synchronize the polarization signals $E_x$ and $E_y$ with the calculation timing of the first coefficient.

The second compensation unit 360 includes a perturbative component calculation unit 316, a second filter unit 318, a second phase modulation unit 322, and a third phase modulation unit 330. The perturbative component calculation unit 316 calculates the second amount of phase rotation based on the two polarization signals $E_x$ and $E_y$. The second filter unit 318 multiplies the second amount of phase rotation by a coefficient for averaging the second amount of phase rotation with time. The second phase modulation unit 322 calculates a second coefficient for cancelling the second amount of phase rotation of the first polarization signal $E_x$ by using the second amount of phase rotation after being processed by the second filter unit 318. The third phase modulation unit 330 calculates a third coefficient for cancelling the second amount of phase rotation of the second polarization signal $E_y$ by using the complex conjugate of the second amount of phase rotation after being processed by the second filter unit 318.

In more detail, a multiplication unit 320 is provided between the second filter unit 318 and the second phase modulation unit 322. The multiplication unit 320 multiples the second amount of phase rotation after being processed by the second filter unit 318 by the second polarization signal $E_y$. Then, the second phase modulation unit 322 calculates the second coefficient using the output of the multiplication unit 320. The second coefficient is added to the first polarization signal $E_x$ after being processed by the multiplication unit 310 using an addition unit 324.

A complex conjugate processing unit 326 and a multiplication unit 328 are provided between the second filter unit 318 and the third phase modulation unit 330. The complex conjugate processing unit 326 calculates the complex conjugate of the second amount of phase rotation after being processed by the second filter unit 318. The multiplication unit 328 multiplies the output of the complex conjugate processing unit 326 by the first polarization signal E. Then, the third phase modulation unit 330 calculates the third coefficient using the output of the multiplication unit 328. The third coefficient is added to the second polarization signal $E_y$ after being processed by the multiplication unit 314 using an addition unit 332.

If the processing in the first compensation unit 350 and the second compensation unit 360 is represented by numerical expressions, Expressions (3) and (4) described below are obtained. In the following expressions, k is a sample timing of a digital signal.

[Math 3]

$$E'_x(k) = E_x(k)\exp\left[-j\sum_{m=0}^{n-1} h(n)\gamma(|E_x(k-m)|^2 + |E_y(k-m)|^2)\right] - jE_y(k)\sum_{m=0}^{n-1} h(n)\gamma_2 E_x(k-m)E_y^*(k-m) \quad (3)$$

[Math 4]

$$E'_y(k) = E_y(k)\exp\left[-j\sum_{m=0}^{n-1} h(n)\gamma(|E_y(k-m)|^2 + |E_x(k-m)|^2)\right] - jE_x(k)\sum_{m=0}^{n-1} h(n)\gamma_2 E_y(k-m)E_x^*(k-m) \quad (4)$$

In the two expressions described above, both the first terms represent the processing in the first compensation unit 350, and both the third terms represent the processing in the second compensation unit 360.

Specifically, the strength calculation unit 302 calculates a first amount of phase rotation $\theta_1$ according to Expression (5) described below.

[Math 5]

$$\theta_1 = \gamma(|E_x(k)|^2 + |E_y(k)|^2) \tag{5}$$

The first filter unit 304 multiples the first amount of phase rotation $\theta_1$ calculated by the strength calculation unit 302 by the coefficient h(n) for averaging the first amount of phase rotation $\theta_1$ with time. Here, n is the number of filter taps.

The first phase modulation unit 306 calculates a value according to Expression (6) described below. Specifically, the first phase modulation unit 306 performs calculation of an exp function. In the first phase modulation unit 306, the exp functions is expanded to a cos function and a sin function. Since a trigonometric function cannot be applied directly to a circuit, the processing is performed using a look-up table.

[Math 6]

$$\exp\left[-j\sum_{m=0}^{n-1} h(n)\gamma(|E_x(k-m)|^2 + |E_y(k-m)|^2)\right] \tag{6}$$

The perturbative component calculation unit 316 calculates the second amount of phase rotation $\theta_2$ according to Expression (7) described below.

[Math 7]

$$\theta_2 = \gamma_2 E_x(k) E^*_y(k) \tag{7}$$

The second filter unit 318 multiples the second amount of phase rotation $\theta_2$ calculated by the perturbative component calculation unit 316 by the coefficient h(n) for averaging the second amount of phase rotation $\theta_2$ with time.

The second phase modulation unit 322 calculates a value according to Expression (8) described below.

[Math 8]

$$-jE_y(k)\sum_{m=0}^{n-1} h(n)\gamma_2 E_x(k-m) E^*_y(k-m) \tag{8}$$

The third phase modulation unit 330 calculates a value according to Expression (9) described below.

[Math 9]

$$-jE_x(k)\sum_{m=0}^{n-1} h(n)\gamma_2 E_y(k-m) E^*_x(k-m) \tag{9}$$

Figure 5:
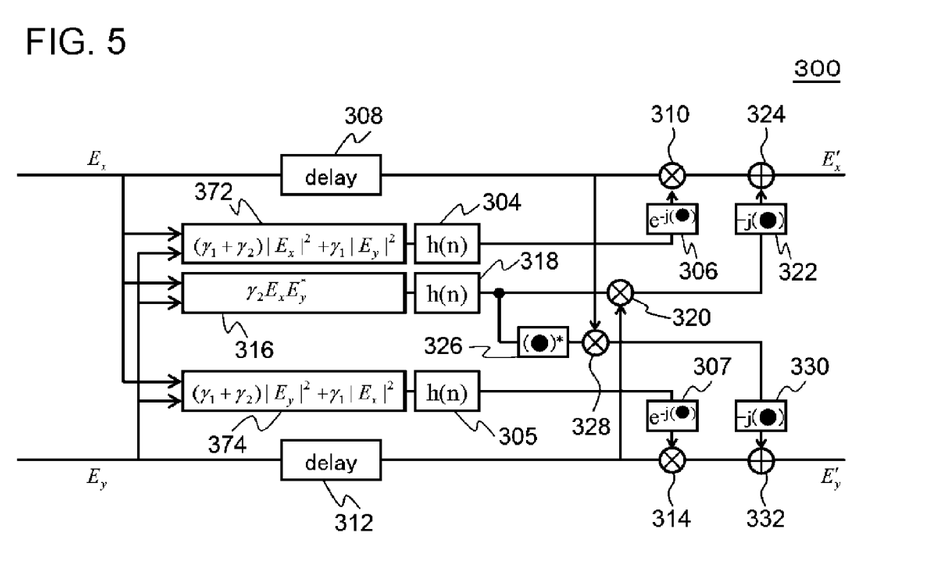
FIG. 5 is a diagram showing the configuration of a nonlinear compensation unit according to a comparative example.

FIG. 5 is a diagram showing the configuration of a nonlinear compensation unit 300 according to a comparative example. The comparative example shows the configuration of the general nonlinear compensation unit 300 in Perturbation Back Propagation. The nonlinear compensation unit 300 shown in the drawing includes strength calculation units 372 and 374 instead of the strength calculation unit 302. In other words, in this exemplary embodiment, one strength calculation unit 302 is shared between the two polarization signals $E_x$ and $E_y$. Due to this, the nonlinear compensation unit 300 of this exemplary embodiment is smaller in circuit scale than the general nonlinear compensation unit 300.

The nonlinear compensation unit 300 shown in FIG. 5 performs processing according to Expressions (10) and (11) described below.

[Math 10]

$$E'_x(k) = \tag{10}$$

$$E_x(k)\exp\left[-j\sum_{m=0}^{n-1} h(n)((\gamma_1+\gamma_2)|E_x(k-m)|^2 + \gamma_1|E_y(k-m)|^2)\right] -$$

$$jE_y(k)\sum_{m=0}^{n-1} h(n)\gamma_2 E_x(k-m) E^*_y(k-m)$$

[Math 11]

$$E'_y(k) = \tag{11}$$

$$E_y(k)\exp\left[-j\sum_{m=0}^{n-1} h(n)((\gamma_1+\gamma_2)|E_y(k-m)|^2 + \gamma_1|E_x(k-m)|^2)\right] -$$

$$jE_x(k)\sum_{m=0}^{n-1} h(n)\gamma_2 E_y(k-m) E^*_x(k-m)$$

As $\gamma_2$ in Expressions (3), (4), (8), and (9), the same value as $\gamma_2$ in Expressions (10) and (11) can be used. In addition, $\gamma_1+\gamma_2=\gamma$ is established. It is preferable that $\gamma_1=\gamma_2$. For this reason, in Expressions (3), (4), (8), and (9), it is preferable that $\gamma=2\gamma_2$.

As described above, according to this exemplary embodiment, it is possible to reduce the circuit scale of the nonlinear compensation unit 300 while maintaining the compensation effect with the nonlinear compensation unit 300.

(Second Exemplary Embodiment)

Figure 6:
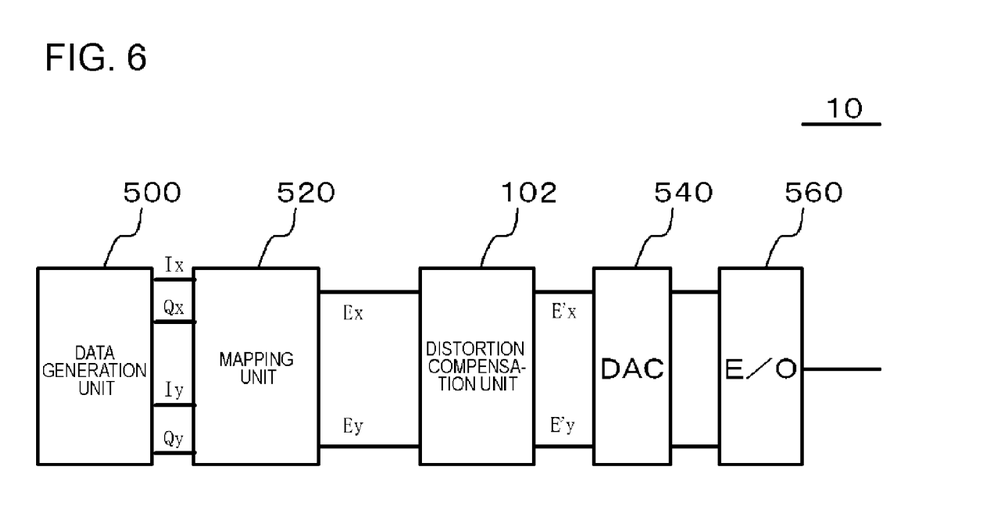
FIG. 6 is a diagram showing the functional configuration of a transmission device according to a second exemplary embodiment.

In an optical communication system of this exemplary embodiment, the nonlinear compensation unit 300 is provided in the optical transmission device 10, not in the optical reception device 20.

FIG. 6 is a diagram showing the functional configuration of an optical transmission device 10 of this exemplary embodiment. The optical transmission device 10 includes a data generation unit 500, a mapping unit 520, a distortion compensation unit 102, a DA (digital-to-analog) conversion unit (DAC) 540, and an electro-optic conversion (E/O) unit 560. The data generation unit 500 generates a plurality of signals (a binary signal of a plurality of digits) to be transmitted. The mapping unit 520 performs mapping to determine to which position of the constellation of a QAM signal a signal generated by the data generation unit 500 is to be allocated using a conversion table. With this, two polarization signals $E_x$ and $E_y$ in which a plurality of signals are allocated to a multi-level signal are generated.

The distortion compensation unit 102 compensates for the linear effect and the nonlinear effect (waveform distortion) applied to the optical signal in the optical reception device 20 in advance with respect to the two polarization signals $E_x$ and $E_y$. The processing of the distortion compensation unit 102 is the same as in the first exemplary embodiment. However, the distortion compensation unit 102 may have only one processing stage including the linear compensation unit 301 and the nonlinear compensation unit 300. In addition, the distortion compensation unit 102 may not have the linear compensation unit 301. In this case, the distortion compensation unit 102 has only the nonlinear compensation unit 300.

The DA conversion unit 540 converts the two polarization signals $E_x$ and $E_y$ after being processed by the distortion compensation unit 102 to analog signals. The electro-optic conversion unit 560 has a laser light source, an optical modulator, and a polarization multiplexing unit, and modulate and polarization multiplexes the optical signal with the two analog signals generated by the DA conversion unit 540 to generate an optical signal to be transmitted. The generated optical signal is transmitted to the optical reception device 20 through the transmission path 30.

According to this exemplary embodiment, the same effects as in the first exemplary embodiment can be obtained.

Although the exemplary embodiments of the invention have been described referring to the drawings, the exemplary embodiments are only examples of the invention, and various configurations other than the above exemplary embodiments can be adopted.

According to the exemplary embodiments described above, the following inventions are disclosed.

(Appendix 1)

A signal processing device which processes two polarization signals, the two polarization signals being generated from four digital signals generated through photoelectric conversion and analog-to-digital conversion on four output light components generated by making polarization multiplexed and multi-level modulated signal light interfere with local light using an optical 90° hybrid as signals corresponding to two polarization components of the signal light, the signal processing device including:

a first compensation unit which compensates for each of the two polarization signals so as to cancel a first amount of phase rotation which is the amount of phase rotation calculated based on the signal strength of the two polarization signals; and a second compensation unit which compensates for each of the two polarization signals so as to cancel a second amount of phase rotation which is the amount of phase rotation calculated based on the perturbative component of the two polarization signals, in which the first compensation unit includes a strength calculation unit which calculates the first amount of phase rotation based on the two polarization signals, a first filter unit which multiplies the first amount of phase rotation by a coefficient for averaging the first amount of phase rotation with time, and a first phase modulation unit which calculates a first coefficient for cancelling the first amount of phase rotation in the two polarization signals by using the first amount of phase rotation after being processed by the first filter unit, and the second compensation unit includes a perturbative component calculation unit which calculates the second amount of phase rotation based on the two polarization signals, a second filter unit which multiplies the second amount of phase rotation by a coefficient for averaging the second amount of phase rotation with time, a second phase modulation unit which calculates a second coefficient for cancelling the second amount of phase rotation of a first polarization signal by using the second amount of phase rotation after being processed by the second filter unit, and a third phase modulation unit which calculates a third coefficient for cancelling the second amount of phase rotation of a second polarization signal by using the complex conjugate of the second amount of phase rotation after being processed by the second filter unit.

(Appendix 2)

The signal processing device according to Appendix 1, further including:

a linear compensation unit which is provided before the first compensation unit and compensates for a linear effect applied to the signal light in a transmission path.

(Appendix 3)

The signal processing device according to Appendix 1 or 2, further including:

the optical 90° hybrid;

a photoelectric conversion unit which performs the photoelectric conversion;

an AD conversion unit which performs the analog-to-digital conversion; and a polarization signal generation unit which generates the two polarization signals from the four digital signals.

(Appendix 4)

A signal processing device which is used to process two polarization signals for generating a polarization multiplexed optical signal, the signal processing device including:

a first compensation unit which compensates for each of the two polarization signals so as to cancel a first amount of phase rotation which is the amount of phase rotation calculated based on the signal strength of the two polarization signals; and a second compensation unit which compensates for each of the two polarization signals so as to cancel a second amount of phase rotation which is the amount of phase rotation calculated based on the perturbative component of the two polarization signals, in which the first compensation unit includes a strength calculation unit which calculates the first amount of phase rotation based on the two polarization signals, a first filter unit which multiplies the first amount of phase rotation by a coefficient for averaging the first amount of phase rotation with time, and a first phase modulation unit which calculates a first coefficient for cancelling the first amount of phase rotation in the two polarization signals by using the first amount of phase rotation after being processed by the first filter unit, and the second compensation unit includes a perturbative component calculation unit which calculates the second amount of phase rotation based on the two polarization signals, a second filter unit which multiplies the second amount of phase rotation by a coefficient for averaging the second amount of phase rotation with time, a second phase modulation unit which calculates a second coefficient for cancelling the second amount of phase rotation of a first polarization signal by using the second amount of phase rotation after being processed by the second filter unit, and a third phase modulation unit which calculates a third coefficient for cancelling the second amount of phase rotation of a second polarization signal by using the complex conjugate of the second amount of phase rotation after being processed by the second filter unit.

(Appendix 5)

The signal processing device according to Appendix 4, further including:

a mapping unit which allocates the plurality of signals to a multi-level signal to generate the two polarization signals;

a DA conversion unit which performs digital-to-analog conversion on each of the two polarization signals after being processed by the first compensation unit and the second compensation unit; and an electro-optic conversion unit which performs modulation processing using two analog signals generated by the DA conversion unit to generate the optical signal.

(Appendix 6)

The signal processing device according to anyone of Appendixes 1 to 5, in which the strength calculation unit calculates the first amount of phase rotation $\theta_1$ according to Expression (1)

$$\theta_1 = \gamma(|E_x|^2 + |E_y|^2) \qquad (1)$$

provided, $E_x$: the strength of the first polarization signal, $E_y$: the strength of the second polarization signal, and $\gamma$: a coefficient.

Appendix 7)

The signal processing device according to Appendix 6, in which the perturbative component calculation unit calculates the second amount of phase rotation $\theta_2$ according to Expression (2)

$$\theta_2 = \gamma_2 E_x E_y^* \qquad (2)$$

provided, $E_x$: the strength of the first polarization signal, $E_y$: the strength of the second polarization signal, and $\gamma_2$: a coefficient.

(Appendix 8)

The signal processing device according to Appendix 7, in which $\gamma = 2\gamma_2$.

(Appendix 9)

A signal processing method which processes two polarization signals, the two polarization signals being generated from four digital signals generated through photoelectric conversion and analog-to-digital conversion on four output light components generated by making polarization multiplexed and multi-level modulated signal light interfere with local light using an optical 90° hybrid as signals corresponding to two polarization components of the signal light, the signal processing method performing:

first compensation processing for compensating for each of the two polarization signals so as to cancel a first amount of phase rotation which is the amount of phase rotation calculated based on the signal strength of the two polarization signals; and second compensation processing for compensating for each of the two polarization signals so as to cancel a second amount of phase rotation which is the amount of phase rotation calculated based on the perturbative component of the two polarization signals, in which the first compensation processing includes strength calculation processing for calculating the first amount of phase rotation based on the two polarization signals, first filter processing for multiplying the first amount of phase rotation by a coefficient for averaging the first amount of phase rotation with time, and first phase modulation processing for calculating a first coefficient for cancelling the first amount of phase rotation in the two polarization signals by using the first amount of phase rotation after the first filter processing is performed, and the second compensation processing includes perturbative component calculation processing for calculating the second amount of phase rotation based on the two polarization signals, second filter processing for multiplying the second amount of phase rotation by a coefficient for averaging the second amount of phase rotation with time, second phase modulation processing for calculating a second coefficient for cancelling the second amount of phase rotation of a first polarization signal by using the second amount of phase rotation after the second filter processing is performed, and third phase modulation processing for calculating a third coefficient for cancelling the second amount of phase rotation of a second polarization signal by using the complex conjugate of the second amount of phase rotation after the second filter processing is performed.

(Appendix 10)

The signal processing method according to Appendix 9, further performing:

linear compensation processing which is performed before the first compensation processing and compensates for a linear effect applied to the signal light in a transmission path.

Appendix 11)

A signal processing method which processes two polarization signals for generating a polarization multiplexed optical signal, the signal processing method performing:

first compensation processing for compensating for each of the two polarization signals so as to cancel a first amount of phase rotation which is the amount of phase rotation calculated based on the signal strength of the two polarization signals; and second compensation processing for compensating for each of the two polarization signals so as to cancel a second amount of phase rotation which is the amount of phase rotation calculated based on the perturbative component of the two polarization signals, in which the first compensation processing includes strength calculation processing for calculating the first amount of phase rotation based on the two polarization signals, first filter processing for multiplying the first amount of phase rotation by a coefficient for averaging the first amount of phase rotation with time, and first phase modulation processing for calculating a first coefficient for cancelling the first amount of phase rotation in the two polarization signals by using the first amount of phase rotation after the first filter processing is performed, and the second compensation processing includes perturbative component calculation processing for calculating the second amount of phase rotation based on the two polarization signals, second filter processing for multiplying the second amount of phase rotation by a coefficient for averaging the second amount of phase rotation with time, second phase modulation processing for calculating a second coefficient for cancelling the second amount of phase rotation of a first polarization signal by using the second amount of phase rotation after the second filter processing is performed, and third phase modulation processing for calculating a third coefficient for cancelling the second amount of phase rotation of a second polarization signal by using the complex conjugate of the second amount of phase rotation after the second filter processing is performed.

(Appendix 12)

The signal processing method according to anyone of Appendixes 9 to 11, in which, in the strength calculation processing, the first amount of phase rotation $\theta_1$ is calculated according to Expression (3)

$$\theta_1 = \gamma(|E_x|^2 + |E_y|^2) \quad (3)$$

provided, $E_x$: the strength of the first polarization signal, $E_y$: the strength of the second polarization signal, and $\gamma$: a coefficient.

Appendix 13)

The signal processing method according to Appendix 12, in which, in the perturbative component calculation processing, the second amount of phase rotation $\theta_2$ is calculated according to Expression (4)

$$\theta_2 = \gamma_2 E_x E^*_y \quad (4)$$

provided, $E_x$: the strength of the first polarization signal, $E_y$: the strength of the second polarization signal, and $\gamma_2$: a coefficient.

Appendix 14)

The signal processing method according to Appendix 13, in which $\gamma = 2\gamma_2$.

This application claims priority based on Japanese Patent Application No. 2013-022681, filed on Feb. 7, 2013, the entire disclosure of which is incorporated herein.

What is claimed is:

1. A signal processing device which processes two polarization signals,
   the two polarization signals being generated from four digital signals generated through photoelectric conversion and analog-to-digital conversion on four output light components generated by making polarization multiplexed and multi-level modulated signal light interfere with local light using an optical 90° hybrid as signals corresponding to two polarization components of the signal light, the signal processing device comprising:
   a first compensation unit which compensates for each of the two polarization signals so as to cancel a first amount of phase rotation which is the amount of phase rotation calculated based on the signal strength of the two polarization signals; and
   a second compensation unit which compensates for each of the two polarization signals so as to cancel a second amount of phase rotation which is the amount of phase rotation calculated based on the perturbative component of the two polarization signals,
   wherein the first compensation unit includes
   a strength calculation unit which calculates the first amount of phase rotation based on the two polarization signals,
   a first filter unit which multiplies the first amount of phase rotation by a coefficient for averaging the first amount of phase rotation with time, and
   a first phase modulation unit which calculates a first coefficient for cancelling the first amount of phase rotation in the two polarization signals by using the first amount of phase rotation after being processed by the first filter unit, and
   the second compensation unit includes
   a perturbative component calculation unit which calculates the second amount of phase rotation based on the two polarization signals,
   a second filter unit which multiplies the second amount of phase rotation by a coefficient for averaging the second amount of phase rotation with time,
   a second phase modulation unit which calculates a second coefficient for cancelling the second amount of phase rotation of a first polarization signal by using the second amount of phase rotation after being processed by the second filter unit, and
   a third phase modulation unit which calculates a third coefficient for cancelling the second amount of phase rotation of a second polarization signal by using the complex conjugate of the second amount of phase rotation after being processed by the second filter unit.

2. The signal processing device according to claim 1, further comprising:
   a linear compensation unit which is provided before the first compensation unit and compensates for a linear effect applied to the signal light in a transmission path.

3. The signal processing device according to claim 1, further comprising:
   the optical 90° hybrid;
   a photoelectric conversion unit which performs the photoelectric conversion;
   an AD conversion unit which performs the analog-to-digital conversion; and
   a polarization signal generation unit which generates the two polarization signals from the four digital signals.

4. A signal processing device which is used to process two polarization signals for generating a polarization multiplexed optical signal, the signal processing device comprising:
   a first compensation unit which compensates for each of the two polarization signals so as to cancel a first amount of phase rotation which is the amount of phase rotation calculated based on the signal strength of the two polarization signals; and
   a second compensation unit which compensates for each of the two polarization signals so as to cancel a second amount of phase rotation which is the amount of phase rotation calculated based on the perturbative component of the two polarization signals,
   wherein the first compensation unit includes
   a strength calculation unit which calculates the first amount of phase rotation based on the two polarization signals,
   a first filter unit which multiplies the first amount of phase rotation by a coefficient for averaging the first amount of phase rotation with time, and
   a first phase modulation unit which calculates a first coefficient for cancelling the first amount of phase rotation in the two polarization signals by using the first amount of phase rotation after being processed by the first filter unit, and
   the second compensation unit includes
   a perturbative component calculation unit which calculates the second amount of phase rotation based on the two polarization signals,
   a second filter unit which multiplies the second amount of phase rotation by a coefficient for averaging the second amount of phase rotation with time,
   a second phase modulation unit which calculates a second coefficient for cancelling the second amount of phase rotation of a first polarization signal by using the second amount of phase rotation after being processed by the second filter unit, and a third phase modulation unit which calculates a third coefficient for cancelling the second amount of phase rotation of a second polarization signal by using the complex conjugate of the second amount of phase rotation after being processed by the second filter unit.

5. The signal processing device according to claim 4, further comprising:

a mapping unit which allocates the plurality of signals to a multi-level signal to generate the two polarization signals;

a DA conversion unit which performs digital-to-analog conversion on each of the two polarization signals after being processed by the first compensation unit and the second compensation unit; and an electro-optic conversion unit which performs modulation processing using two analog signals generated by the DA conversion unit to generate the optical signal.

6. The signal processing device according to claim 1, wherein the strength calculation unit calculates the first amount of phase rotation $\theta 1$ according to Expression (1)

$$\theta_1 = \gamma(|E_x|_2 + |E_y|_2) \tag{1}$$

provided, Ex: the strength of the first polarization signal, Ey: the strength of the second polarization signal, and γ: a coefficient.

7. The signal processing device according to claim 6, wherein the perturbative component calculation unit calculates the second amount of phase rotation $\theta 2$ according to Expression (2)

$$\theta 2 = \gamma 2 ExE^* y \tag{2}$$

provided, Ex: the strength of the first polarization signal, Ey: the strength of the second polarization signal, and γ2: a coefficient.

8. The signal processing device according to claim 7, wherein $\gamma=265_2$.

9. A signal processing method which processes two polarization signals, the two polarization signals being generated from four digital signals generated through photoelectric conversion and analog-to-digital conversion on four output light components generated by making polarization multiplexed and multi-level modulated signal light interfere with local light using an optical 90° hybrid as signals corresponding to two polarization components of the signal light, the signal processing method performing:

first compensation processing for compensating for each of the two polarization signals so as to cancel a first amount of phase rotation which is the amount of phase rotation calculated based on the signal strength of the two polarization signals; and second compensation processing for compensating for each of the two polarization signals so as to cancel a second amount of phase rotation which is the amount of phase rotation calculated based on the perturbative component of the two polarization signals, wherein the first compensation processing includes strength calculation processing for calculating the first amount of phase rotation based on the two polarization signals, first filter processing for multiplying the first amount of phase rotation by a coefficient for averaging the first amount of phase rotation with time, and first phase modulation processing for calculating a first coefficient for cancelling the first amount of phase rotation in the two polarization signals by using the first amount of phase rotation after the first filter processing is performed, and the second compensation processing includes perturbative component calculation processing for calculating the second amount of phase rotation based on the two polarization signals, second filter processing for multiplying the second amount of phase rotation by a coefficient for averaging the second amount of phase rotation with time, second phase modulation processing for calculating a second coefficient for cancelling the second amount of phase rotation of a first polarization signal by using the second amount of phase rotation after the second filter processing is performed, and third phase modulation processing for calculating a third coefficient for cancelling the second amount of phase rotation of a second polarization signal by using the complex conjugate of the second amount of phase rotation after the second filter processing is performed.

10. A signal processing method which processes two polarization signals for generating a polarization multiplexed optical signal, the signal processing method performing:

first compensation processing for compensating for each of the two polarization signals so as to cancel a first amount of phase rotation which is the amount of phase rotation calculated based on the signal strength of the two polarization signals; and second compensation processing for compensating for each of the two polarization signals so as to cancel a second amount of phase rotation which is the amount of phase rotation calculated based on the perturbative component of the two polarization signals, wherein the first compensation processing includes strength calculation processing for calculating the first amount of phase rotation based on the two polarization signals, first filter processing for multiplying the first amount of phase rotation by a coefficient for averaging the first amount of phase rotation with time, and first phase modulation processing for calculating a first coefficient for cancelling the first amount of phase rotation in the two polarization signals by using the first amount of phase rotation after the first filter processing is performed, and the second compensation processing includes perturbative component calculation processing for calculating the second amount of phase rotation based on the two polarization signals, second filter processing for multiplying the second amount of phase rotation by a coefficient for averaging the second amount of phase rotation with time, second phase modulation processing for calculating a second coefficient for cancelling the second amount of phase rotation of a first polarization signal by using the second amount of phase rotation after the second filter processing is performed, and third phase modulation processing for calculating a third coefficient for cancelling the second amount of phase rotation of a second polarization signal by using the complex conjugate of the second amount of phase rotation after the second filter processing is performed.

* * * * *